Figure 1:
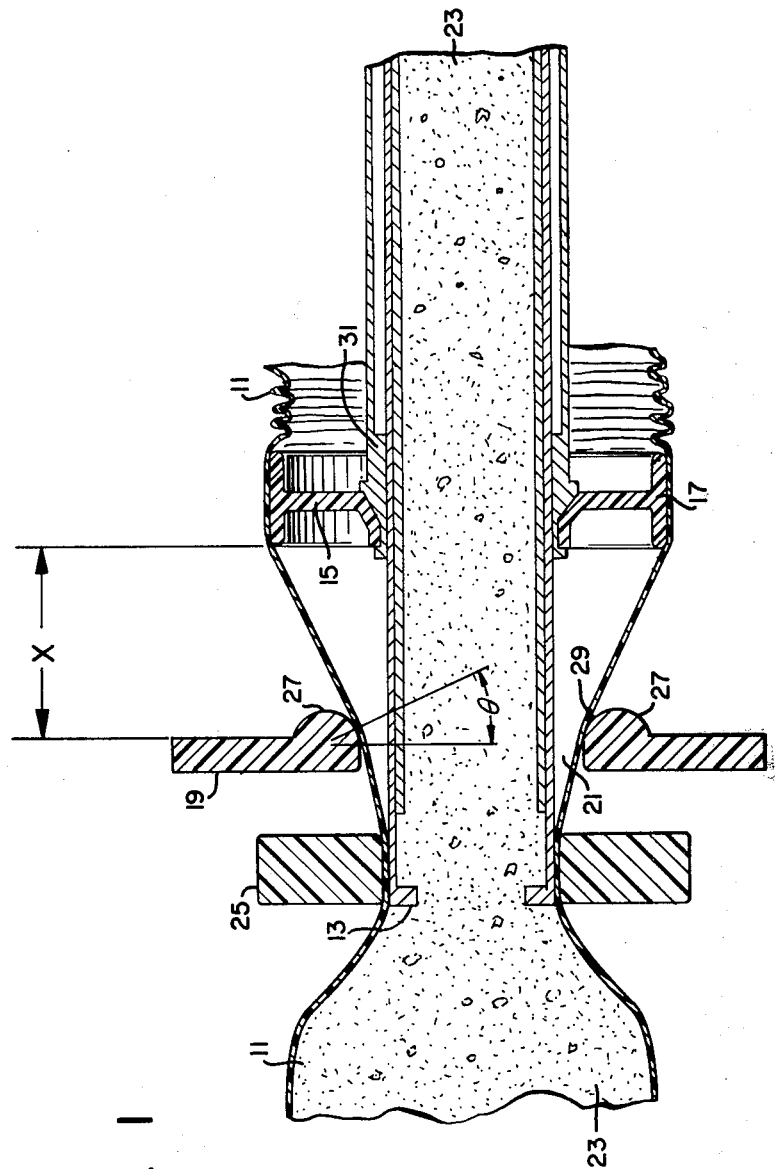

United States Patent [19]  [11] 4,164,057
Frey et al.  [45] Aug. 14, 1979

[54] FOOD CASING STUFFING SIZING CONTROL METHOD

[75] Inventors: Paul H. Frey, La Grange; Vytautas Kupcikevicius, Chicago, both of Ill.

[73] Assignee: Union Carbide Corporation, New York, N.Y.

[21] Appl. No.: 839,560

[22] Filed: Oct. 5, 1977

Related U.S. Application Data

[62] Division of Ser. No. 686,425, May 14, 1976, Pat. No. 4,077,090.

[51] Int. Cl.² ............................................. A22C 11/00
[52] U.S. Cl. ......................................... 17/49; 17/35; 17/41
[58] Field of Search ....................... 17/33–42, 17/45, 49

[56] References Cited

U.S. PATENT DOCUMENTS

| 2,871,508 | 2/1959 | Hill | 17/41 |
|---|---|---|---|
| 2,983,949 | 5/1961 | Matecki | 17/42 |
| 2,984,574 | 5/1961 | Matecki | 17/42 X |
| 2,999,270 | 9/1961 | Knapp | 17/35 |
| 3,264,679 | 8/1966 | Moekle | 17/33 |
| 3,317,950 | 5/1967 | Ziolko | 17/45 |
| 3,451,098 | 6/1969 | Myles et al. | 17/35 |
| 3,454,980 | 8/1973 | Dobbert | 17/35 |
| 3,457,588 | 7/1969 | Myles et al. | 17/41 |
| 3,545,038 | 12/1970 | Myles et al. | 17/49 |
| 3,553,769 | 1/1971 | Myles et al. | 17/49 |
| 3,621,513 | 11/1971 | Kupcikevicius | 17/41 |
| 3,659,317 | 5/1972 | Kupcikevicius | 17/35 |
| 3,731,346 | 5/1973 | Kupcikevicius | 17/49 |
| 3,751,764 | 8/1973 | Dobbert | 17/35 |
| 3,860,996 | 1/1973 | Kupcikevicius et al. | 17/49 |
| 3,872,543 | 3/1975 | Niedecker | 17/33 |
| 3,975,795 | 8/1976 | Kupcikevicius et al. | 17/49 X |

FOREIGN PATENT DOCUMENTS 1632141 9/1971 Fed. Rep. of Germany ............. 17/41

Primary Examiner—Willie G. Abercrombie
Attorney, Agent, or Firm—Maurice W. Ryan

[57] ABSTRACT

An improved sizing control technique utilizes a pressure ring bearing slidably on the outer periphery of a food casing being stuffed, the casing being provided with a convoluting element working conjunctively with a sizing disc inside the casing to provide a wider than previously attainable range of holdback force on the casing, including a maximum holdback force whereat the casing is turned back on its normal direction of progression.

3 Claims, 2 Drawing Figures

FOOD CASING STUFFING SIZING CONTROL METHOD

This application is a division of our prior U.S. application Ser. No. 686,425, filed May 14, 1976, now U.S. Pat. No. 4,077,090, issued Mar. 7, 1978.

This invention relates to an improved technique, apparatus and method for the control of sizing in food casing stuffing processes and more particularly to a stuffed casing food product sizing control system wherein a pressure or snubbing ring bearing slideably on the outer peripheral surface of a food casing being stuffed is provided with a casing convoluting element which works conjunctively and coacts with a sizing disc disposed inside the casting, to convolute and turn the locus of the moving casing back on itself with respect to its normal direction of progression, and thereby provide a wider than previously attainable range of holdback force of the casing as it is being stuffed.

In the meat packing industry, techniques are known for the automatic and semiautomatic filling of various types of casings with viscous meat emulsion. In general, these techniques include positioning a shirred continuous film casing length over a stuffing horn and thereafter continuously deshirring the casing and stuffing the deshirred casing with viscous meat emulsion fed under pressure through the stuffing horn and into the casing interior. As used herein, the term casing or tubular casing is intended to mean tubing of natural or manufactured materials, and the term "casing length" is intended to mean continuous tubular casing lengths. Shirred tubular casings are also known to persons familiar with the art as "sticks", such "sticks" being long lengths of casing having a substantially large bore, which have been shirred and compressed into short compact self-sustaining lengths, or which may be a package of shirred and compressed casing sheathed inside a retaining sleeve. Apparatus and processes are well known in the food casing art for producing shirred tubular cellulosic food casings such as, for example, the apparatus and processes disclosed in U.S. Pat. Nos. 2,983,949 and 2,984,574 to Matecki. These apparatus may be employed in the preparation of pleated and compressed tubular casings wherein the compression ratios (unshirred to shirred stick length) are in the order of at least about 40:1 and up to about 100:1 or even greater. Using suitable food stuffing machinery, casing lengths can be stuffed and formed into unit size links of particulate or comminuted viscous materials, such as meat emulsions, or the like.

In the art of producing sausages and similar food products, the finely divided meat compositions commonly referred to as emulsions, are conventionally stuffed into the tubular casing materials of long length which, as stated above, may be of natural or manufactured materials. Large sausage products used in slicing for multislice package putup are usually made in casings which range in size from the trade designation #2½ (73 1 mm. diameter) to #9 (129 mm. diameter). In the production of large sausage products, a clip closed end casing of precut length is first manually sheathed over the end of a stuffing horn and then stuffed with a food emulsion. As the stuffing operation progresses, the clip closed end of the casing moves outward of the stuffing horn and the casing itself deshirrs and reattains its original length, or a length substantially close to its original length. The stuffed casing is then tied, twisted or clipped into predetermined unit length cylindrical packages.

The thusly stuffed and encased food emulsion is subsequently cooked and cured according to one or the other of conventional processes, depending on the product being made, and may thereafter be, and usually is, sliced and packaged into units of predetermined weight and slice count for retail sale. The high speed slicing devices employed in such packaging operations are pre-set to yield a specific weight-by-slice count for use in obtaining unit packages of equal weight. Therefore an important aspect of a commercially acceptable large sausage product is that the tubular finished processed sausage product have a substantially uniform diameter from end to end and in successive pieces of the same designated size. Moreover, the diameter of the slices must be uniformly precise in order to assure that the slices will fit into the preformed rigid packaging frequently used.

Since a large sausage casing stuffed with a food emulsion has two generally hemispherical, rounded ends, these rounded ends are generally not used in producing equal weight packages and are either discarded or reworked. Thus another aspect of importance commercially is to have a large sausage casing stuffed with uniform tight ends to thereby minimize the amount of end portion food product cut off from the uniformly cylindrical portion.

Years of commercial utilization of manufactured sausage casings such as prepared from unsupported or fibrous reinforced cellulose have provided the experience for determining optimum stuffing and processing conditions for various classes of sausage product. Sausage generally needs to be encased or stuffed to "green" or unprocessed diameters that have been selected on such experience and recommended for such optimum performance. In commercial practice, a recommended stuffing diameter for each size and type of casing has been established and tabulated in recommended operating procedures determined by the casing manufacturer for guidance of the sausage maker.

When a casing is understuffed from the recommended "green" diameter, the result generally is a processed product that is not uniform in diameter from end to end and from piece to piece; the product is undesirably wrinkled in appearance; and the processed sausage may have an emulsion breakdown yielding undesirable pockets of fat or liquid.

When a casing is overstuffed from the recommended "green" diameter, the casing may split or break apart at the stuffing station or subsequently, in transport to or in the cooking/smoking processing operations. This results in a costly waste of emulsion and in the labor expense for cleanup.

For many years, the apparatus and methods employed to prepare such encased food products, particularly food products encased in large diameter casings, have relied largely if not exclusively on manual manipulation in controlling the stuffing of food emulsion into predetermined length sausage links or packages. Recently, advances in the art have resulted in the introduction of apparatus for machine control of the stuffing operation which have provided means for preparing uniformly sized encased products such as disclosed, for example, in U.S. Pat. Nos. 2,871,508, 2,999,270, 3,264,679, 3,317,950, 3,454,980, 3,457,588, 3,553,769, 3,621,513, 3,659,317 and 3,751,764. Of particular interest in this respect is U.S. Pat. No. 4,044,426, the disclosure of which is incorporated here by reference.

In the automatic sausage casing stuffing technique epitomized in the above-noted U.S. Pat. No. 4,044,426 the technique is found to involve the combination of a sizing ring or disc arranged and disposed inside the casing being stuffed, coacting with an annular snubbing ring arranged and disposed exteriorly of the casing a selectably variable distance along the casing length from the sizing ring. The sizing ring has an outer rim circumference greater than the inner circumference of the casing, and the annular snubbing ring has an inner passage circumference smaller than the outer circumference of the finished sausage product being made. Both the sizing disc and the snubbing ring are disposed in coaxial alignment with the stuffing horn of the sausage making machine, and provision is made to controllably vary the linear distance between the sizing disc and the snubbing ring.

By lessening this linear distance, the change in the path of casing moving from its stretched circumference as it deshirrs over the sizing disc, to its proscribed circumference as it passes through the space between the stuffing horn outer surface and the inner passage circumference of the snubbing ring, becomes more abrupt and increased frictional forces at the areas of casing contact with these control elements will increase a braking or holdback action on the casing. Conversely, by increasing the linear distance between the sizing disc and the snubbing ring, the change in the path of the casing between these two casing contacting elements becomes less abrupt, effecting a decrease in frictional forces at the casing contact areas with a consequent decrease of braking or holdback action on the casing. Now, it can be readily appreciated that for a given and reasonably closely maintained set of operating parameters, including type and condition of casing, consistency of the emulsion, emulsion pump speed and output pressure and, say the parts wear condition of the stuffing apparatus, an increased holdback force on the casing will tend to cause higher casing internal pressure and a larger product circumference, while decreased holdback force on the casing will lessen casing internal pressure and make for a smaller product circumference.

Since the desideratum is to maintain a constant product circumference, for the purposes and reasons hereinabove described, the linear distance between the sizing disc and the snubbing ring is controllably changed to compensate for variations and aberrations in the other aforedescribed operating parameters which are not so easily controlled.

Thus, prior to the present invention, the advance in the art which comprises the invention disclosed in the aforementioned U.S. Pat. No. 4,044,426, comprehended the attainment of holdback control by controllably varying the distance between the sizing disc and the snubbing ring.

As development of the apparatus and method concepts disclosed in U.S. Pat. No. 4,044,426 it became apparent that a greater degree of control and expansion of the range of the attainable product diameter was necessary, not towards making products of greater varying diameters, but towards providing greater compensating potential in the stuffing apparatus to accommodate the uncertainties attending variations in casing compositions and materials, variations in meat emulsions, and other operating parameter swings. Viewed from the position of engineering development, this constituted a goal to provide a capability to understuff and/or to overstuff the casing being filled in any given stuffing operation to an extent greater than heretofore possible, and with enhanced control and precision. It was further apparent to and substantiated by the developers that while increasing the sizing disc diameter increased the casing holdback and could provide some degree of increment at the overstuffing end of the controlled range, such step not only did nothing for the understuffing end of the range, but if carried too far, it could stretch the casing to an extent so far greater than the diameter of the finished sausage product, that the casing material elastic limit would be exceeded, or the casing otherwise detrimentally affected. If an undersized diameter sizing disc was used in an effort to increment the understuffing end of the range, the results would be different but equally undesirable since the casing would not be stretched enough to provide uniform stretch-sizing to enable attainment of a precisely uniform stuffed product diameter.

In U.S. patent application of Kupcikevicius et al, Ser. No. 686,427, filed concurrently with this application and being assigned to the same assignee as this application, relates to an invention which provides one way to solve the aforedescribed problem. This invention provides another way, which may be used by itself, or advantageously in conjunction with the invention disclosed in the aforesaid U.S. application Ser. No. 686,427.

With this then being the state of the art, the present invention was conceived and developed to provide a greater than heretofore attainable degree of control and range between overstuffed diameters and understuffed diameters in food casing stuffing operations.

The invention also provides, through the attainment of its principal objective, greatly increased capability to adjust for, compensate, and correct a greater than heretofore possible number and variety of operational swings, parameter variations, maladjustments, and apparatus parts wear in food casing stuffing operations.

In general, the invention relates to apparatus for stuffing continuous lengths of food casing which have been shirred and mounted on a stuffing element, over a sizing disc disposed interiorly of the casing with an outer circumference stretch-contacting the inner surface of the casing as it deshirrs, and through a casing circumference contracting passage defined between the inner circumference of an annular snubbing ring and the outer circumferential surface of the stuffing horn, the distance along the casing between said sizing disc and said annular snubbing ring being controllably variable, and, more specifically, constitutes an improvement comprising an annular projection at the inner circumference of said annular snubbing ring extending in a direction opposite the direction of progression of casing being stuffed, defining a casing outer surface peripheral contact surface which is generally arcuate in the direction of casing progression, and means on the sizing disc to vary the contact area between the casing outer surface and said contact surface on said projection, between minimal contact when maximum distance between the sizing disc and the snubbing ring obtains, and maximal contact when miminum distance between the sizing disc and the snubbing ring obtains.

The means on the sizing disc changes the direction of casing progression from its deshirring and stuffing direction towards a direction opposite its deshirring and stuffing direction as the distance between the sizing disc and the snubbing ring changes from maximum towards minimum.

At its ultimate holdback setting, the means on the sizing disc changes the direction of casing progression from its deshirring and stuffing direction to a direction having a component opposite its deshirring and stuffing direction.

In terms of method the invention relates to sizing control in food casing stuffing wherein casing being stuffed is first expanded by interior circumferential contact and then contracted by exterior circumferential contact, the distance between the locations of interior and exterior circumferential contact being variable, and, specifically, to the improvement of increasing the area of exterior circumferential contact by changing the direction of progression of the casing from a first position wherein minimal exterior circumferential contact obtains, towards and into a second position wherein maximal exterior circumferential contact obtains.

Figure 2:
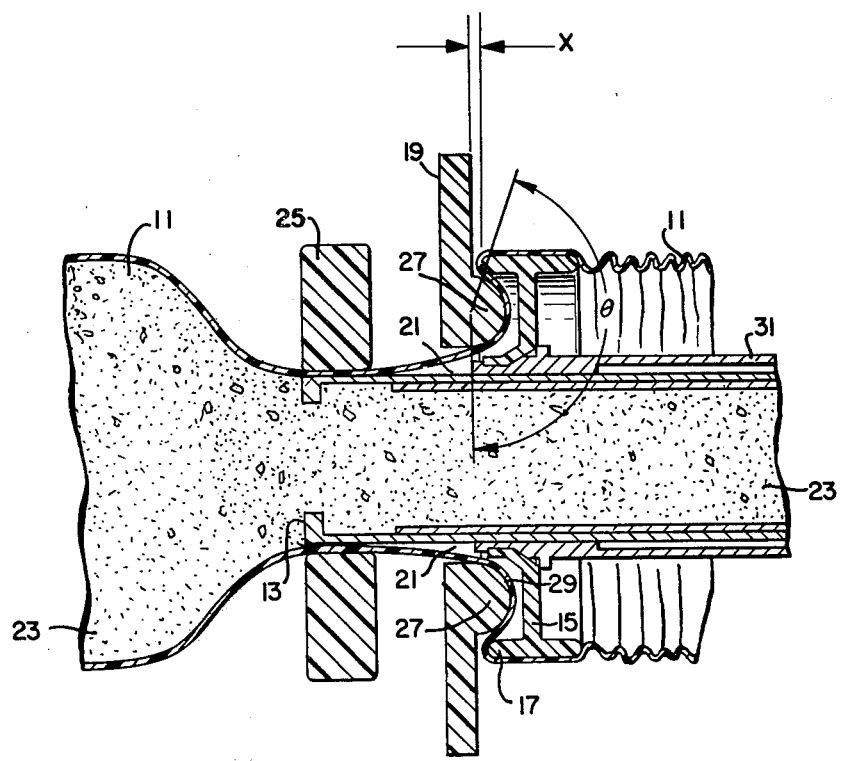

These and other features and advantages of the invention will become the more readily understood and appreciated from the following detailed description and the appended drawing, wherein:

FIG. 1 is a side elevation sectional schematic view of apparatus according to the invention shown in place on a stuffing machine in cooperative arrangement with other stuffing apparatus elements; and FIG. 2 is another view of the apparatus of FIG. 1 shown with the elements in other operative positions.

The drawing shows a section of a length of food casing 11 in place on the stuffing horn 13 of a casing filling machine. Only those parts of the casing filling machine considered essential to an understanding of this invention are shown in the drawing. The casing 11 is shown shirred at the right on the drawing figures and undergoing deshirring and filling as its passes from right to left to its ultimate filled condition as shown at the left in both figures of the drawing.

A sizing disc 15 is disposed concentrically on the stuffing horn 13 interiorly of the casing 11 with its outer circumferential rim 17 in slidable contact with the inner circumferential surface of the casing 11 adjacent the shirred portion of casing at the right in the drawing figures.

An annular snubbing ring 19, having an inner passage 21 smaller than the outer circumference of the finished sausage product being made is arranged and disposed concentrically on the stuffing horn 13 as shown. A sealing ring 25 arranged at the end of stuffing horn 13, serves to hold the casing 11 snugly against the stuffing horn 13 outer surface and thereby prevent emulsion backflow into the as yet unfilled zones in the deshirring casing.

The snubbing ring 19 is formed with an annular projection 27 extending towards the right of the drawing figures in a direction opposite the direction of progression of casing 11 being stuffed. The casing contacting surface 29 of annular projection 27 is an arcuate surface, curved in the direction of casing progression and, in the illustrative embodiment, curved all the way in a curvilinear return to the rear surface of the snubbing ring 19.

Sizing disc 15 is mounted on a reciprocally slidably movable sleeve 31 mounted coaxially on stuffing horn 13 and can be moved controllably by means not shown through the distance X shown maximally in FIG. 1 and minimally in FIG. 2 of the drawing.

As sausage product emulsion 23 under pressure from an emulsion pump means, not shown, feeds into the casing 11 from the stuffing horn 13, the casing fills to the condition shown at the left in the drawing figures. The casing 11 is continuously drawn from its shirred condition shown at the right in the drawing figures, over the rim 17 of sizing disc 15, then circumferentially proscribed and infolded through passage 21 of snubbing ring 19, with its outer surface contacting the arcuate surface 29 on annular projection 27 of snubbing ring 19 through an angle $\theta$ which is in effect, a measure of the extent of casing wrap around on the snubbing ring braking surface.

The adjustment of the distance X between the sizing discs 15 and the snubbing ring 19, in combination with any given set of operating parameters such as sizing disc diameter and the like factors, will determine the angle $\theta$ casing exterior surface contact against the surface 29, and thus govern the extent to which the wrap around frictional forces are developed to effect braking action and casing holdback. When the distance X is increased, there is lessening in the degree of wrap around as increased by the angle $\theta$ shown in FIG. 1 of the drawing, and the casing will tend to be understuffed, while a decrease in X distance, to, say the condition shown in FIG. 2 of the drawing, will increase the wrap around angle $\theta$, increase the holdback force, and tend to effect casing overstuffing.

As the control distance X changes from a maximum condition illustrated in FIG. 1 of the drawing, towards and into the minimum illustrated in FIG. 2, the direction of the path of progression of the casing 11 changes from its normal deshirring and filling direction towards, and ultimately into, a direction opposite deshirring and filling direction. In this respect, the annular projection 27 with its casing wrap-around contacting surface 29, may properly be categorized as a casing convoluting element.

Materials of construction for fabricating snubbing rings according to the present invention have been found most suitably to be polyethylene and styrene and combinations of those. It is considered within the ken of the applications engineer to select the material or combination of materials last suited to a particular set of operational conditions.

The invention works well with any design of sizing disc which can effect maximum angle $\theta$ wrap-around contact of the casing exterior surface against the contacting surface 29 of projection 27 of the snubbing ring 19. Sizing discs with forwardly projecting rims, such as described in the copending application of Kupcikevicius et al, U.S. application Ser. No. 686,427, filed concurrently with this application, and being assigned to the said assignee as this application have been found to work advantageously in combination with this invention.

Alternative modes of practicing the invention will, in the light of the foregoing disclosure, undoubtedly suggest themselves to persons skilled in the art. It is thus intended that the disclosure by taken as illustrative only, and not construed in any limiting sense.

What is claimed is:

1. In a method of sizing control in food casing stuffing wherein casing being stuffed is first expanded by interior circumferential contact and then contracted by exterior circumferential contact, the distance between the locations of interior and exterior circumferential contact being variable, the improvement of increasing the area of exterior circumferential contact by changing the direction of progression of the casing from a first position wherein minimal exterior circumferential contact obtains, towards and into a second position wherein maximal exterior circumferential contact obtains, and wherein which second position the casing passes through a traverse in a direction opposite to its direction of progression.

2. In a method of sizing control in food casing stuffing wherein casing being stuffed is first frictionally restrained by interior circumferential contact and then further frictionally restrained by exterior circumferential contact, the distance between the locations of interior and exterior circumferential contact being variable, the improvement of increasing the area of exterior circumferential contact from a first position wherein minimal exterior circumferential contact obtains, towards and into a second position wherein maximal exterior circumferential contact obtains, and wherein which second position the casing passes through a traverse in a direction opposite to its direction of progression.

3. The method of claim 2 wherein the first frictional restraint is accomplished by internal expansion of the casing and the further frictional restraint is accomplished by contraction of the casing.

* * * * *